(12) United States Patent
Pergande et al.

(10) Patent No.: US 11,194,148 B2
(45) Date of Patent: Dec. 7, 2021

(54) OBJECTIVE CHANGER APPARATUS FOR A MICROSCOPE SYSTEM, ADAPTER FOR AN OBJECTIVE AND METHOD FOR MOVING AN OBJECTIVE INTO POSITION

(71) Applicant: Carl Zeiss Microscopy GmbH, Jena (DE)

(72) Inventors: Saskia Pergande, Jena (DE); Ingo Fahlbusch, Göttingen (DE); Peter Schacht, Erfurt (DE); Daniel Stegmann, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 342 days.

(21) Appl. No.: 16/386,845

(22) Filed: Apr. 17, 2019

(65) Prior Publication Data
US 2019/0324255 A1    Oct. 24, 2019

(30) Foreign Application Priority Data

Apr. 18, 2018 (DE) ...................... 10 2018 205 894.6

(51) Int. Cl.
*G02B 21/24* (2006.01)
(52) U.S. Cl.
CPC .................................. *G02B 21/248* (2013.01)
(58) Field of Classification Search
None
See application file for complete search history.

(56) References Cited

U.S. PATENT DOCUMENTS 6,636,352 B2 * 10/2003 Engelhardt ........ G02B 21/0072
359/368
8,553,323 B2 * 10/2013 Gilbert ................... G02B 21/02
359/381
(Continued)

FOREIGN PATENT DOCUMENTS

DE         15 47 374       12/1969
DE    10 2007 058 341       6/2009
(Continued)

OTHER PUBLICATIONS

German Search Report for Application No. 10 2018 205 894.6 dated Sep. 18, 2018.

*Primary Examiner* — Derek S. Chapel
(74) *Attorney, Agent, or Firm* — Haug Partners LLP

(57) ABSTRACT

An objective-changer apparatus for a microscope system comprising an objective-transfer element with at least one objective holder for holding an objective that has been provided with an adapter, wherein the objective-transfer element moves a selected active objective into position in a transfer position in controlled fashion and an objective axis of the active objective does not coincide with the optical axis of the microscope system in the transfer position. A receiving apparatus is adjustable in the direction of the optical axis of the microscope system and can be brought into contact with the adapter. The receiving apparatus transports the active objective along a transport path in a transport direction orthogonal to the microscope system's optical axis between the transfer position and a work position in line with the microscope system's optical axis. The transport path is shorter than the extent of the objective holder in the transport direction.

16 Claims, 15 Drawing Sheets

(56) References Cited

U.S. PATENT DOCUMENTS

| | | | | |
|---|---|---|---|---|
| 9,001,419 B2* | 4/2015 | Fahlbusch | ................ | G02B 7/14 |
| | | | | 359/368 |
| 2015/0022882 A1* | 1/2015 | Ue | ........................ | G02B 21/06 |
| | | | | 359/385 |
| 2018/0231759 A1* | 8/2018 | Schacht | ............... | G02B 21/248 |

FOREIGN PATENT DOCUMENTS

| | | |
|---|---|---|
| DE | 10 2009 029 146 | 12/2010 |
| DE | 10 2015 221 040 | 5/2017 |
| WO | WO 2004/077123 | 9/2004 |
| WO | WO 2012/097191 | 7/2012 |

\* cited by examiner

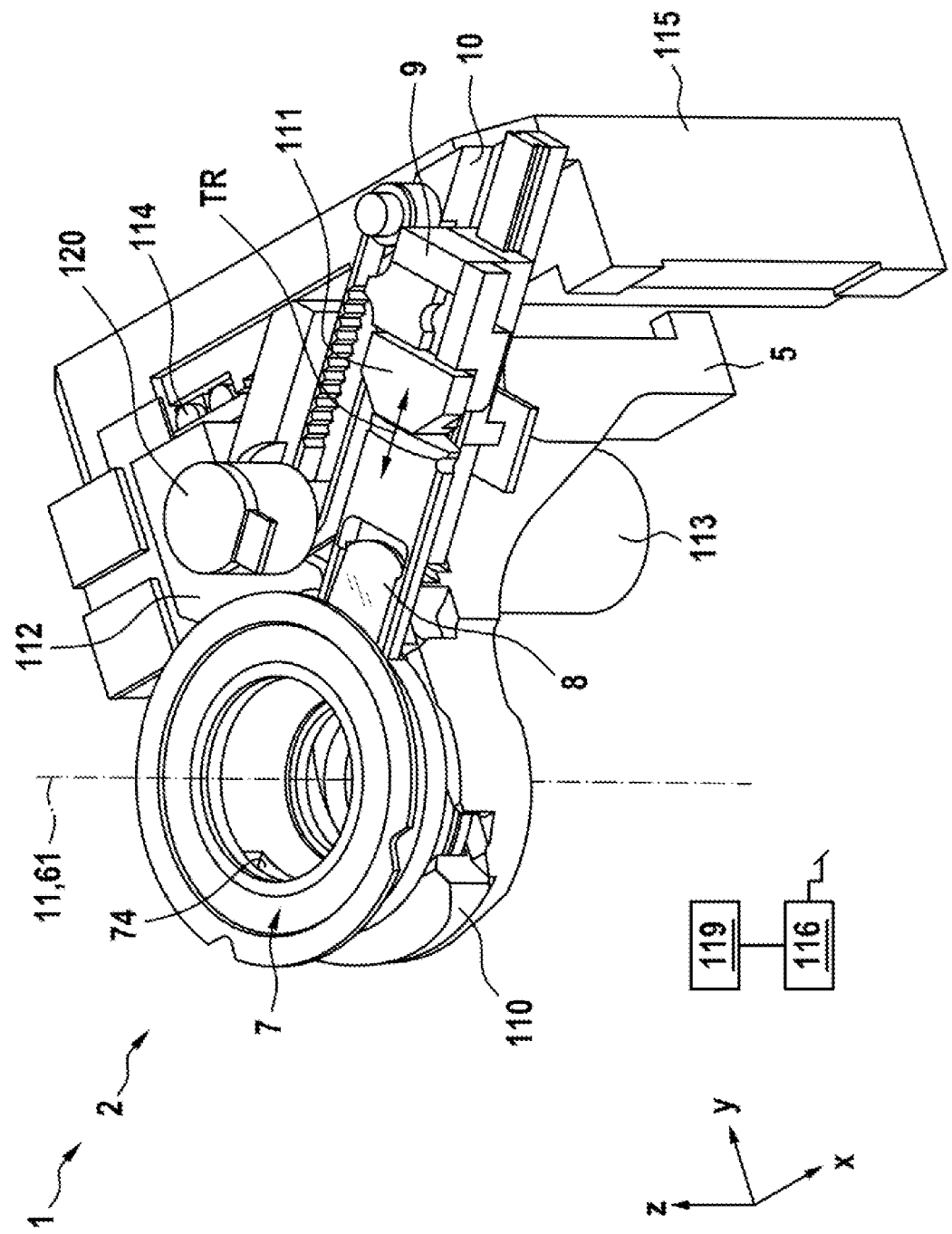

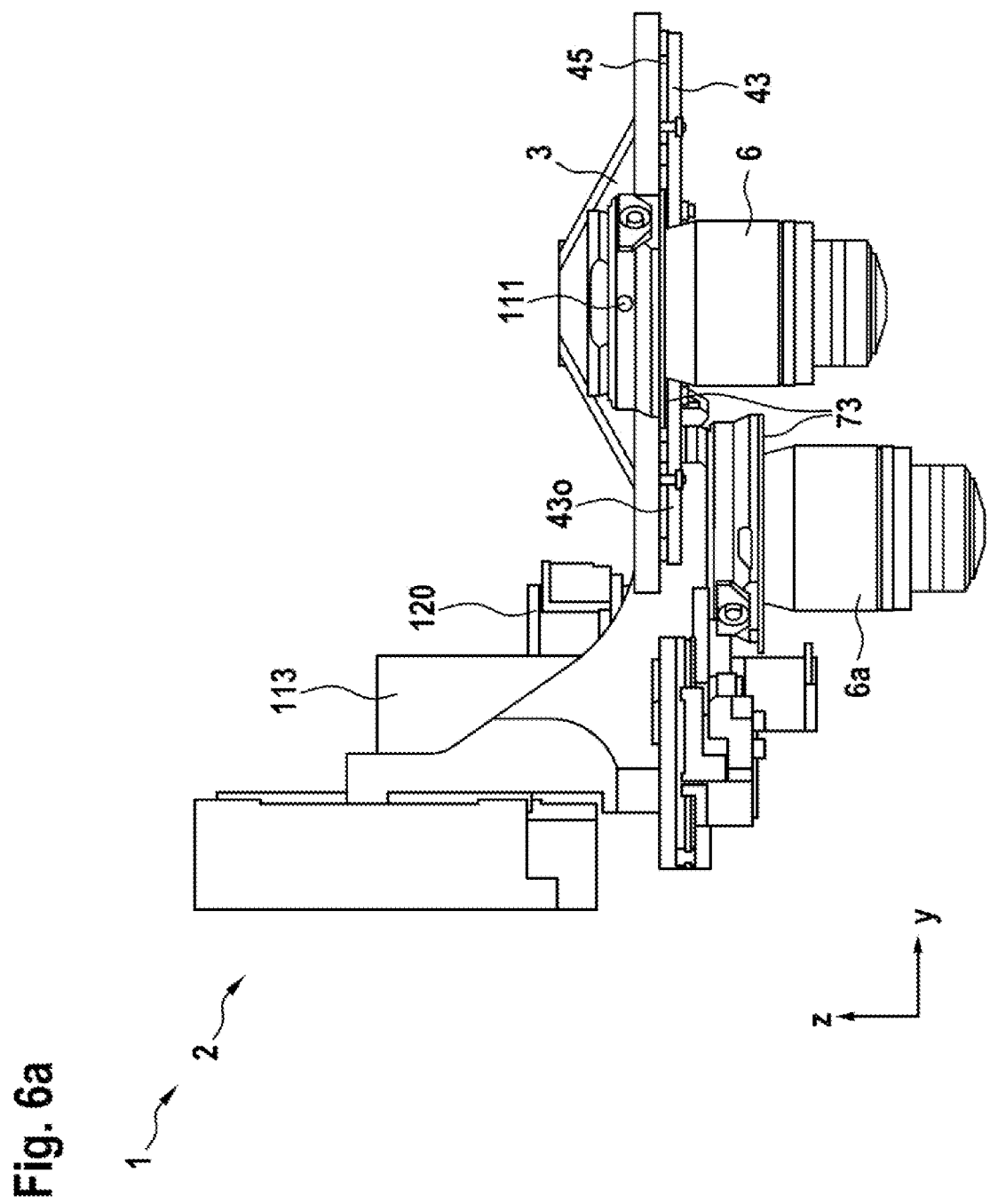

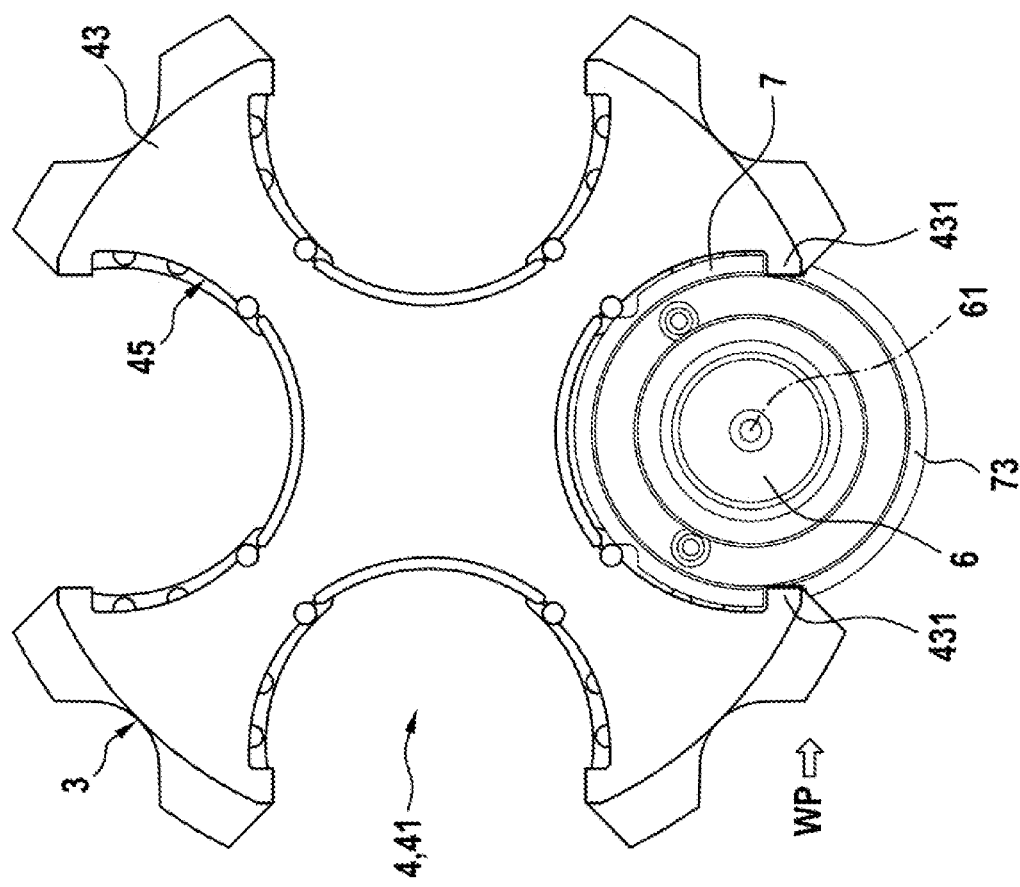

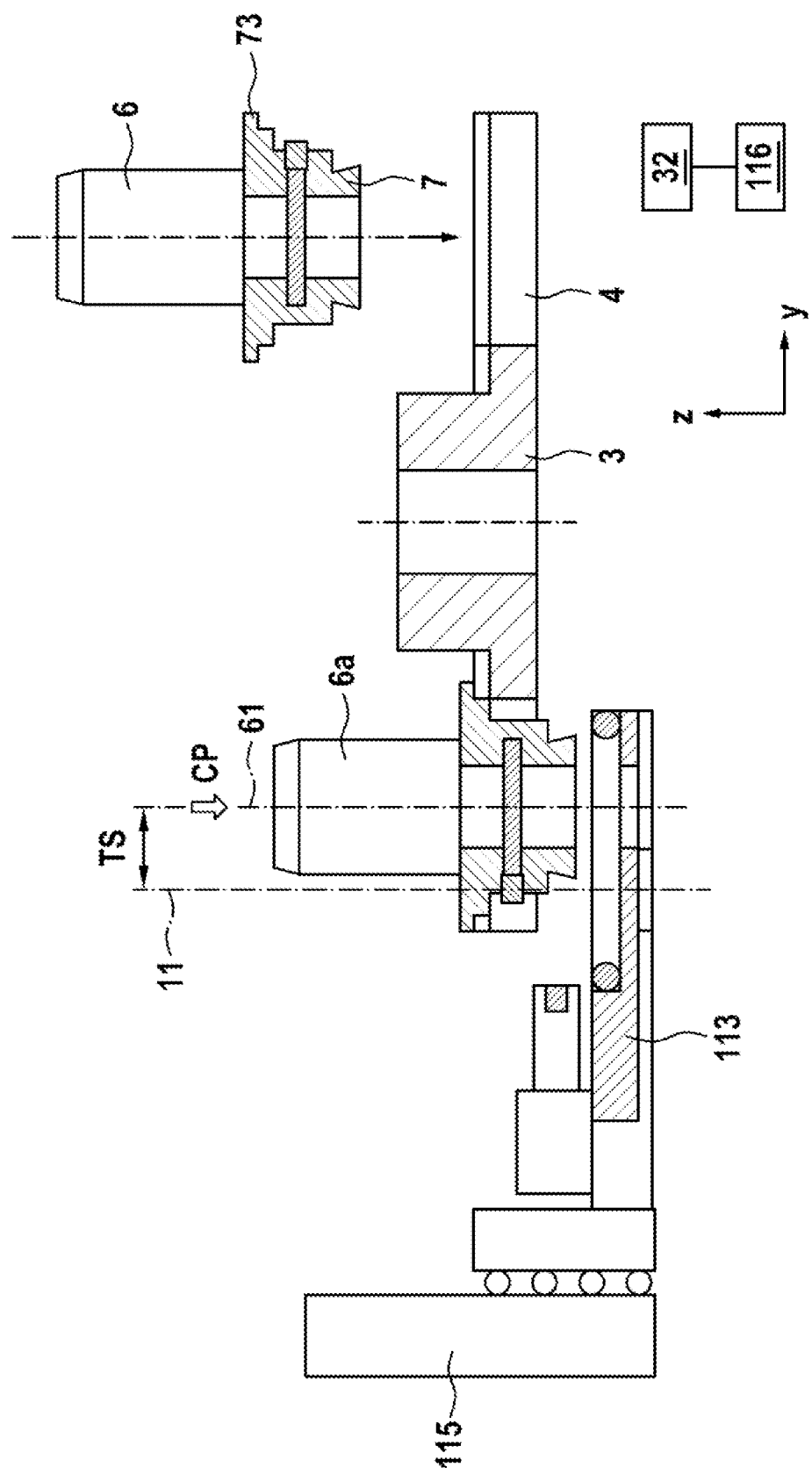

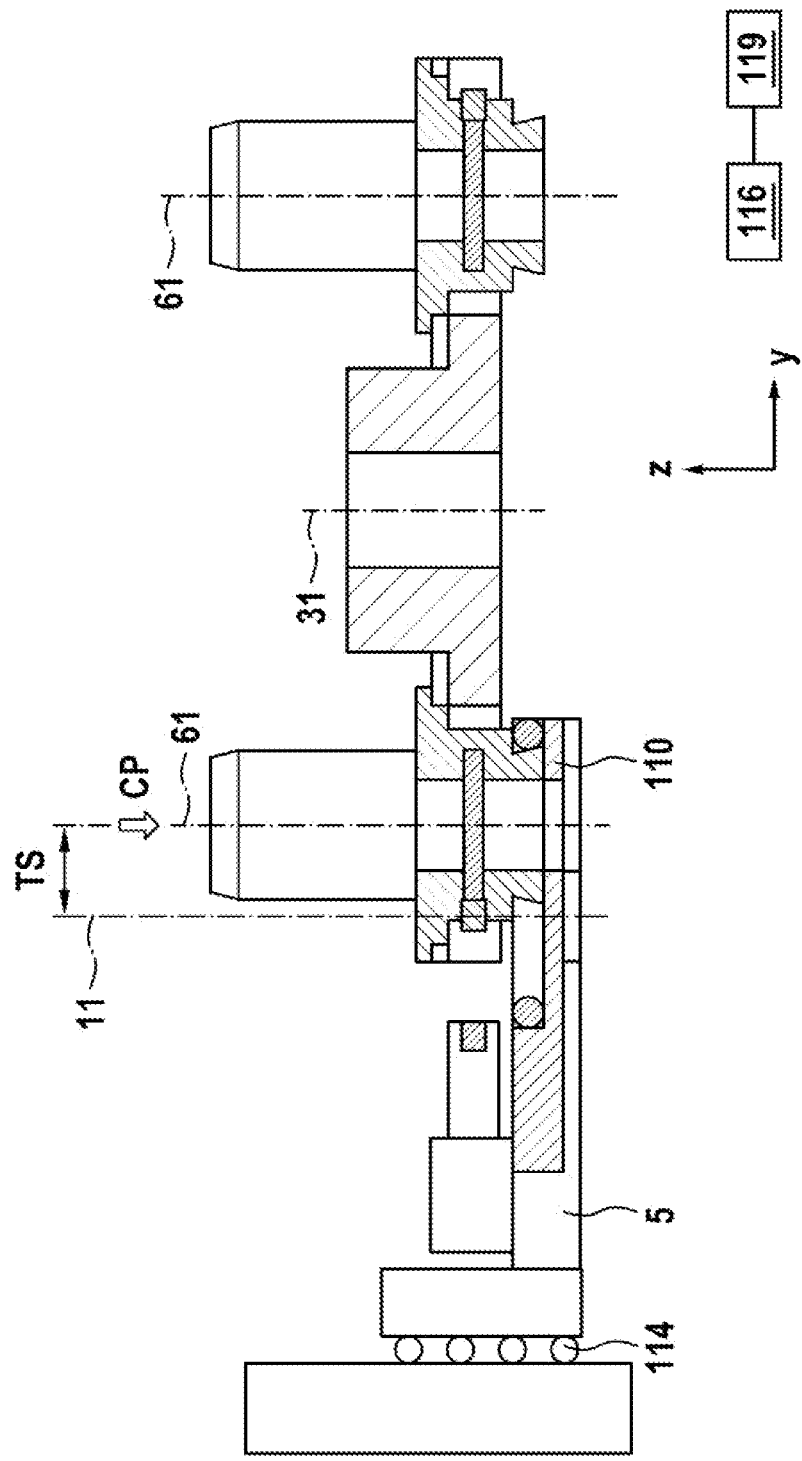

OBJECTIVE CHANGER APPARATUS FOR A MICROSCOPE SYSTEM, ADAPTER FOR AN OBJECTIVE AND METHOD FOR MOVING AN OBJECTIVE INTO POSITION

The present application claims priority from German Patent Application No. 10 2018 205 894.6 filed on Apr. 18, 2018, the disclosure of which is incorporated herein by reference in its entirety.

FIELD OF THE INVENTION

It is noted that citation or identification of any document in this application is not an admission that such document is available as prior art to the present invention.

The invention relates to an objective changer apparatus for a microscope system and the configuration of an adapter of an objective. Furthermore, the invention relates to a method for moving an objective with an adapter into position in line with the optical axis of a microscope system.

Many modern microscopy methods require highly precise positioning of the microscope objectives used in each case for image capture. Thus, for example, an active objective used for recording images when recording stacks of individual images lying in succession in the direction of an optical axis of the microscope system (image stack, z-stack) must be able to be moved in very dynamic and very accurate fashion. Moreover, a change between different objectives is required in order to be able to realize the microscopy process on an object with different magnifications and resolutions.

The objectives kept available in a microscope are usually arranged and held in an objective revolver. Here, an objective currently used or provided for recording images is situated in a work position, while the other objectives held in the objective revolver are pivoted out of the work position.

When the objective respectively situated in the work position is focused in this case, the objective revolver is moved in the focusing direction—generally referred to as the Z-direction—together with the objectives that are currently not in use. Thus, the entire mass of all the objectives currently not in use and the mass of the objective revolver are displaced during each focusing process, causing high retention and acceleration forces and requiring a solid design of the drive path and the guides. The large mass to be moved leads to high mechanical loads and pretension in the power train, and promotes disadvantageous drift effects. Moreover, so-called stick-slip effects are promoted, and the susceptibility to vibrations and the wear are increased.

The off-centred, i.e., lying away from the optical axis of the microscope system, centre of gravity of the objective revolver exerts disadvantageous leverages on the guides of the objective revolver. If different objectives are contained in the objective revolver, changing the objectives moreover leads to a displacement of the centre of gravity, and hence to a modified load situation. This likewise has a negative effect on the positioning accuracy, obtainment of the image section and the accuracy of the objective movements.

The prior art has disclosed solutions which do not include the entire objective revolver in the focusing movement.

Thus, WO2004/077123 A2 has described a microscope system which has an objective transfer element with a number of interchangeable objectives. A selected objective can be brought in line with the optical axis of the microscope system by means of the objective transfer element. Each of the objectives is movable coaxially in relation to the optical axis, independently of the other objectives. The objective situated in line with the optical axis can be focused by means of an actuator element, independently of the other objectives and without moving the objective transfer element. A disadvantage thereof is that an insufficiently precise movement of the selected objective into position in line with the optical axis cannot be compensated, or can only be compensated by means of passively acting alignment means.

DE 10 2007 058 341 A1 relates to an objective changer system for an optical measuring device, in particular a microscope device, comprising at least one objective, which is mounted in a supported holding device and which can be moved by means of a displacement device between a use or a work position, in which the at least one objective can be displaced in coaxial fashion in relation to an optical measurement axis for focusing purposes, and a not-in-use position.

Further technical solutions are known from DE 10 2015 221 040 A1, for example. In that case, the invention described relates to a microscope having an objective changer apparatus comprising a magazine for receiving a number of objectives at respective magazine positions and an objective receptacle which is embodied to receive an objective and arranged in an optical beam path of the microscope. The microscope is characterized by a transport of a respectively selected objective that has an objective holder, wherein transport is implemented between its magazine position, moved into position at a transfer position, and the objective receptacle by means of an objective positioning device. The objective receptacle remains in the optical beam path while the objective is transported.

Either the above-described disadvantages in respect of the comparatively low precision and repetition accuracy occur in the objective changer apparatuses known from the prior art, or long positioning paths are required for the objectives.

SUMMARY OF THE INVENTION

The invention is based on the object of proposing an option for precisely moving at least one selected active objective into position in a desired position with high repetition accuracy and, in the process, reducing the disadvantages of the prior art.

The object is achieved by an objective changer apparatus for a microscope system, an adapter for an objective and a method for moving an objective that is provided with an adapter and held in an objective holder into position according to the independent and alternative independent claims. Advantageous developments are the subject matter of the dependent claims.

The objective changer apparatus for a microscope system has an objective transfer element (also abbreviated to transfer element below) with at least one objective holder for holding an objective that has been provided with an adapter. Here, the objective transfer element is embodied to move a selected active objective into position in a transfer position in controlled fashion. The objective has an optical axis, which is also referred to as objective axis below. The objective axis of the active objective does not coincide with the optical axis of the microscope system in the transfer position. Furthermore, the objective changer apparatus has a receiving apparatus that is adjustable in the direction of the optical axis of the microscope system and able to be brought into contact with the adapter of the active objective. The receiving apparatus is embodied to transport the active objective along a transport path in a transport direction that is essentially orthogonal to the optical axis of the microscope system between the transfer position and a work position in line with the optical axis of the microscope system.

According to the invention, the transport path is shorter than the extent of the objective holder in the transport direction, and so at least regions of the adapter of the active objective situated in the work position are still within the extent of the objective holder. Here, the length of the transport path is measured as the shortest path, e.g., as an orthogonal offset, from the transfer position to the work position. The adapter also counts as still situated in the objective holder if, in a plan view from the direction of the optical axis of the microscope system, at least regions of the adapter of the active objective situated in the work position are still situated within the extent of the objective holder. Thus, it is possible to lift the objective with the adapter out of the objective holder.

Distances between the objective axis of an objective situated in the transfer position and the optical axis of the microscope system are preferably a few millimetres, for example 1, 2, 3, 5, 10, 20 or 30 millimetres, depending on the diameter of the objective. Advantageously, the distance is one tenth, one fifth, one quarter, one third, half or at most three quarters of the diameter of the objective, for example.

In an advantageous embodiment of the objective changer apparatus, the receiving apparatus is displaceable coaxially to the optical axis of the microscope system. The receiving apparatus is embodied to lift the active objective in order to remove the objective from the objective holder. To this end, the receiving apparatus is displaceable in the direction of the optical axis, for example in a motor-controlled manner.

Below, the assumption is made that an objective has always been provided with an adapter. From the view of the purely mechanical requirements, the processes of moving into position into the transfer position and into the work position could also be carried out by the adapter on its own.

An important aspect of the objective changer apparatus consists in precise positioning of the active objective, which is accurately repeated, in line with the optical axis of the microscope system. To this end, the objective receptacle has been provided with alignment faces, at which the active objective can contact faces of the adapter that are embodied to come into contact with the alignment faces. In respect of their form, dimensions and accuracy, the contact faces and the alignment faces are designed and manufactured in such a way that a respective active objective contacting the alignment faces with the contact faces is aligned parallel to the optical axis of the microscope system. The objective axis of the active objective then coincides with the optical axis of the microscope system.

The reproducibility of the position is achieved by way of the contact faces and alignment faces. By way of example, these form a three-point bearing or a three-point contact. By way of example, such positioning may be realized by means of a dovetail element that is aligned with respect to the optical beam path and by clamping the contact faces and alignment faces against one another by means of the gripper.

In order to achieve ideal three-point clamping, a conical base of the adapter, a dovetail ring, for example, can have a corresponding embodiment that is interrupted to form partial segments such that only two partial segments (contact faces) engage with respective alignment faces and define contact points. A third contact point could be realized by way of a spring element in the gripper, which acts as an alignment face and which is guided against a further contact face of the adapter.

Three balls could also be present on the base of the adapter instead of a dovetail ring, said balls protruding slightly out of the adapter in the downward and lateral directions. Consequently, a three-point bearing could be realized on a face of the objective receptacle and, at the same time, a three-point contact could be realized on the objective receptacle in the lateral direction.

In a further embodiment option for the objective changer apparatus according to the invention, the alignment faces are embodied as angled faces, for example in the form of lying V-grooves. The alignment faces can be distributed at an angle of 120° in relation to one another and in relation to the contact point of the gripper.

By way of example, the objective transfer element can be embodied as a revolver, as a strip magazine, as a chain magazine, as a conveyor belt or as a slider. A transfer from a rack magazine by means of a robotic arm is also possible. The process of equipping the objective transfer element can be implemented both manually and by a pick-and-place machine, which may provide an additional objective magazine.

In one embodiment of the objective changer apparatus, the objective transfer element has at least one objective holder which is embodied as a fork. By way of example, a fork-shaped objective holder allows a movement of the objective in the transport direction without having to completely lift the objective out of the objective holder, for example parallel to the optical axis, in the process.

A fork-shaped objective holder can have a U-shaped design with limbs that are substantially parallel to one another. By way of example, this embodiment option is used in upright arrangements that comprise a further holding element, by means of which an adapter is securely held, even in the case of rotational movements of the transfer element. In further embodiment options, the fork-shaped objective holder can be slightly closed, i.e., the ends of the limbs are slightly closer to one another.

In this case, it is advantageous if at least the ends of the limbs have a resilient design such that an adapter can be inserted into the objective holder, and removed therefrom, under slight bending of the ends thereof. If the objective with the adapter is situated in the objective holder, the ends of the limbs rest against the adapter and thus hold the latter securely in the objective holder. To this end, it is advantageous if the external dimensions of the adapter correspond to the internal dimensions of the respective objective holder in such a way that the adapter—and, with the latter, the objective—is held in the objective holder with only little play. By way of example, this embodiment is suitable for inverse arrangements. Here, it is possible to dispense with a further holding element.

The objective changer apparatus can be designed for both an inverse and an upright arrangement of the active objective. Here, in an inverse arrangement, the active objective and the receiving apparatus are situated below the object plane in which a specimen to be observed can be arranged (specimen plane). The active objective is directed on the object plane from below and seated on the objective holder. In an upright arrangement, the active objective and the receiving apparatus are situated above the object plane. The active objective is suspended in the objective holder. To this end, the objective holder can have a holding element, on which the flange of the respective objective adapter lies. Expressed in general, each objective holder has a locking device, the effect of which causes the adapter to be blocked in the objective holder, at least in a direction parallel to the optical axis. This locking device can be the aforementioned holding element in an upright arrangement or an edge of the objective holder in an inverse arrangement, on which the adapter lies with a flange.

If the objective changer apparatus is embodied as an upright arrangement, the objectives can be inserted from a lateral direction into a gap between the respective objective holder, once again with a fork-shaped embodiment, for example, and the locking device, the additional holding element, for example, in a possible embodiment for equipping the transfer element that acts as a magazine.

As described above, the objective holder can be embodied as a resilient fork. In a further embodiment option of the invention, the objective holder may have an approximately U-shaped embodiment and the further holding element can be designed in the form of a resilient knuckle joint.

When the objective is inserted with the same adapter as in the inverse arrangement, the ends of the limbs of the fork are opened as a result of the lateral pressure exerted by the adapter flange and, on account of the resilient embodiment of the fork, said ends are pulled shut again after the final position of the objective has been reached about its flange. Consequently, the objective is securely held in the case of movements of the transfer element.

Alternatively, the forks could have such an embodiment that the objective adapter is inserted not through the opening of the fork but transversely to the plane in which the fork extends with its limbs. To this end, the respective adapter is moved by way of a further, resilient holding element, for example by way of a resilient latch. By way of example, this further holding element is initially pushed away in the lateral direction and then engages in a correspondingly formed structure of the adapter. Advantageously, the spring force of the further holding element is dimensioned in such a way that the mass (or the resultant weight) of the respective objective and, optionally, the respective masses of all other usable objectives is/are held against gravity and possible acceleration forces. An employed drive for moving the receiving apparatus in the direction of the Z-axis (Z-drive) must be able to overcome this holding force.

By way of example, coarse drives and/or fine drives, stepper motor drives and/or piezo-drives can be used as a Z-drive. The receiving apparatus can be fastened to a stand. By way of example, a precise and low-friction guidance of the receiving apparatus that is moved in the Z-direction can be realized by means of sliding guides, ball guides and/or roller guides.

It is also possible to use one or more switchable electromagnets in order to hold the respective objectives and/or adapters in the objective holder, in the transfer element or in the receiving apparatus. These electromagnets are deactivated as soon as the adapter has been clamped.

Alternatively, permanent magnets may also be present on the adapter and transfer element and may be configured in such a way that the opposite poles thereof are opposite one another and attract one another. This magnetic force can be cancelled by a translational movement perpendicular to the optical axis of the microscope system or by a rotational movement, for example about the optical axis of the objective. Further magnets may be arranged in a further embodiment of the invention, said magnets standing opposite the magnets of the adapter with the same polarity after a translational movement or rotational movement. The same magnetic poles directed against one another cancel the holding force or additionally repel one another.

In order to be able to capture image data with the active objective, the latter must be brought into the beam path of the microscope system. Here, the objective axis of the active objective and the optical axis of the microscope system must coincide. To this end, the receiving apparatus has a gripper in an advantageous embodiment of the objective changer apparatus, said gripper being embodied to engage with the active objective. The gripper is controllably displaceable in the transport direction. Moreover, an objective receptacle or an object receptacle face is present, which is embodied as a conveyor track for the active objective displaced by means of the gripper and for receiving the active objective in line with the optical axis of the microscope system. With its contact faces, the adapter is movable against the alignment faces by means of the receiving apparatus, in particular by means of the gripper.

The following drives, inter alia, can be used for the lateral movement of the gripper: a motor with a spindle drive, a disc cam, a belt drive, a cable pull, a toothed rack/pinion drive, an SMA (smart metal alloy) wire drive, piezo-drives, adjustable wedges, nut-spindle pairs or other actuators for converting rotational movement into linear movement.

In order to facilitate a movement of the active objective in the Z-direction along the optical axis of the microscope system, a mechanical element, for example a motor-driven lever, may act against the spring force of the holding element and press-open the fork until the objective is freely movable in the Z-direction. The ends of the fork limbs can be guided in grooves in order to hold the objective in the transfer element against gravity.

The objective changer apparatus is combinable with an optical element that can be moved into the beam path of the microscope system where necessary. In one possible embodiment of the invention, the optical element is a motor-driven DIC (differential interference contrast) slider. In order to be able to move the optical element into, or out of, the beam path, a slot for the optical element, in particular for the DIC slider, is provided in the adapter. Each objective can have a dedicated optical element assigned thereto, the latter remaining on the respective objective or adapter, even when the active objective is returned to the transfer element. Advantageously, only a single drive is present for all optical elements in such an embodiment. This drive always only engages with the optical element of the respectively active objective, positions the latter with great sensitivity for the respective application, a DIC application, for example, or pulls the optical element out of the beam path when not in use. The optical element is explained in more detail below using the example of a DIC slider.

The DIC slider can be securely connected to the adapter and can remain on the adapter independently of the current usage state thereof. It is also possible for the DIC slider to be inserted in the slot of the respective active objective and to be able to be removed from the slot. Within the meaning of this description, a removable DIC slider is not securely connected to the adapter.

A carriage that is movable into the optical axis of the microscope system and out of the optical axis of the microscope system is present in further embodiments of the invention. The DIC slider is movable into the optical axis of the microscope system or out of the optical axis of the microscope system by means of the carriage. To this end, the carriage may be controllable and driven by a motor. In further embodiment options, it may also be embodied to be movable into, or from, the beam path of the microscope system by hand and, for example, be attached to the receiving apparatus.

The carriage may be provided with at least one magnet, by means of which a detachable holding force is producible between carriage and DIC slider. By way of example, the detachable holding force can be producible by means of controllable electromagnets and/or by means of permanent magnets. Strippers that overcome the holding force when necessary and separate carriage and DIC slider from one another are required if permanent magnets are used.

By way of example, for the purposes of positioning the DIC slider into or removing said DIC slider from the beam path of the active objective, a carriage with a magnet is driven to the coupling site of the DIC slider and docks on the latter. Alternatively, use can also be made of another coupling mechanism between carriage and DIC slider, e.g., resilient elements, electrically switchable magnets or mechanically acting coupling mechanisms. The coupling has to be released again after the DIC slider has been returned to the slot of the adapter. The stripper is required in the case of permanent magnets in order to act against the holding force of the magnetic coupling between DIC slider and magnet on the carriage, by virtue of it holding the DIC slider in its position in the slot while the carriage is retracted again. This stripper may be assembled on the gripper, which may simultaneously have the function of pushing the adapter or the adapter with the objective back in the direction of the transfer element again when the gripper is opened.

An advantage of the objective changer apparatus according to the invention consists of only a single objective being situated on the receiving apparatus and having to be moved into position, i.e., moved, in the Z-direction. As a result, the power train only still has to move the mass of the active objective. The effects of inertia and the stick-slip effect are reduced. As a consequence thereof, the moving objective can be braked and accelerated quickly, and hence a quick focusing process can be facilitated. Therefore, the objective changer apparatus according to the invention has significantly improved dynamic properties in relation to solutions according to the prior art.

A further advantage consists of the lower mass raising the natural frequency of the objective changer apparatus, reducing the vibration amplitudes at the same excitation energy and significantly reducing the susceptibility to building vibrations, for example. The lower deviations caused by the dynamics resulting therefrom lead to an improved resolution of a captured image over the image capturing time. In contrast thereto, a combination of high mass and low rigidity, as arises, for example, from the installation space arrangement of known objective changer apparatuses, leads to a low natural frequency.

The objective changer apparatus according to the invention can be used in the entire field of microscopy with very different objectives, from wide-field microscopy to light-sheet microscopy via confocal microscopes, and also in a white-light interferometer.

The invention also comprises an adapter for use with an objective in an objective changer apparatus according to the invention.

The adapter has a flange to be placed on the objective holder, by means of which the adapter is held, or can be held, in the objective holder. Moreover, it has protrusions and/or indents, which correspond to correspondingly formed guides of the receiving apparatus. Indents of the adapter should also be understood to mean instances of flattening on the external circumference of the adapter. By way of example, one or more lateral instances of flattening can be present on the adapter and lateral guide faces can be present on the receiving apparatus. The protrusions and/or indents and the guide faces corresponding thereto cause the alignment of the adapter to be maintained during the transport along the transport path. At least one of the protrusions and/or indents of the adapter can have a contact face.

By way of example, ensuring the relative alignment of the adapter is of importance for the use of the DIC slider and, moreover, this allows electrical contacting of the adapter and/or a transfer of media from or to the adapter. By way of example, maintaining the orientation of the adapter in the transfer element can be achieved by way of guide pins in the transfer element and grooves in the flange of the adapter.

In a further possible embodiment of the objective changer apparatus according to the invention, a transfer point of media in liquid or gaseous form and of mixtures (aerosols, gels) to the objective and/or the adapter may be present. By way of example, this transfer point can be used for an immersion, preferably an automated immersion, over the objective or for sucking away immersion liquid, and for a temperature-control of the objective.

The transfer and/or reception of media can be implemented by means of appropriately embodied feed and discharge lines and fitting coupling elements. Additionally, pumps, sensors and media reservoirs may be present in order to facilitate a media exchange. A control unit may be connected to the pumps and/or sensors in order to regulate or control the media exchange.

It is advantageous that the transfer point for feeding and/or discharging the medium need not be attached to a transfer element such as a rotatable revolver, for example, which would consequently have a restricted rotational movement and in which a possibly complicated and expensive rotational passage would have to be provided.

An adapter according to the invention can be provided with an objective and can be used in a microscope system.

An objective changer apparatus according to the invention and an adapter according to the invention have several advantages over known solutions from the prior art.

Thus, the active objective is moved into position parallel to the optical axis of the microscope system but nevertheless remains with a slight offset to the beam path of the optical system. The little travel required for positioning into the work position from the transfer position allows short positioning times and causes little mechanical wear.

Moreover, the interface between objective adapter and receiving apparatus can be embodied with electrical contacts, for example for identifying an objective, for objectives with integrated illumination, for objectives with an integrated camera (overview objective) or for motor-driven objectives. By way of example, contact pins and/or contact faces may be present in the receiving apparatus, which establish an electrically conductive connection with contact pins or contact faces of the adapter when the adapter is brought into the work position or received in the receiving apparatus.

Different compensation lengths of objectives can be compensated by appropriately saved, i.e., stored in retrievable fashion, positioning travels in the Z-direction that can be set when required or compensated by different adapter lengths. Moreover, the adapter can be designed for different objective interfaces, e.g., for different thread sizes and bayonet variants.

The highly dynamic positioning of the active objective can be implemented with comparatively low mass and high rigidity of the receiving apparatus, in particular. On account of the expedient force relationships, the drive components can have a compact, light and cost-effective embodiment. No great demands on the accuracy are placed on the receptacle positions of the individual objectives in the transfer element, as is the case, in contrast thereto, in conventional objective revolvers. Thus, each individual objective holder in an assembled revolver group according to the prior art must be processed with great outlay in order to meet the high demands on tolerances during an objective change. In the case of the objective changer apparatus according to the invention, only one objective receptacle of the receiving apparatus must be aligned once in relation to the optical axis of the microscope system. Each active objective always obtains exactly the same position in the microscope beam path by way of its adapter.

By way of example, conventional objective and objective revolver arrangements have disadvantages in methods of three-dimensional imaging, such as the 3D sectioning methods, since maintaining a constant distance between the specimen to be observed and the objective is hardly ever achieved. A changing distance has a negative influence on the quality of the image recording. The invention facilitates an improved observance of such a constant distance.

The objective changer apparatus according to the invention advantageously facilitates fast, precise movement into position of different objectives with repeatable accuracy, from the transfer position into the work position.

Further, the object is achieved by a method for moving an objective that is provided with an adapter and held in an objective holder into position in line with an optical axis of a microscope system. The method according to the invention comprises the steps of moving a selected active objective into a transfer position, wherein an objective axis of the active objective does not coincide with the optical axis of the microscope system in the transfer position, and of transporting the active objective from the transfer position along a transport path and in a transport direction that is essentially orthogonal to the optical axis of the microscope system to a work position by means of a receiving apparatus. Here, the objective axis of the active objective coincides with the optical axis of the microscope system in the work position. The length of the transport path is chosen to be shorter than the extent of the objective holder in the transport direction such that at least regions of the adapter of the active objective situated in the work position are still within the extent of the objective holder. In a further step, the active objective, situated in the work position, is moved in controlled fashion along the optical axis for the purposes of focusing the active objective.

The method according to the invention can be preceded by selecting an active objective from a number of objectives.

In a configuration of the method, the active objective in the transfer position is displaced a distance parallel to the optical axis of the microscope system and then transported to the work position. The active objective is released from the objective holder as a consequence of the parallel displacement. As a result, the released active objective is unlocked and movable in the transport direction, in particular orthogonal to the optical axis of the microscope system.

BRIEF DESCRIPTION OF THE DRAWINGS

FIG. 5 shows a schematic illustration of the objective and the receiving apparatus with a stripper in the receiving apparatus.

FIGS. 6a and 6b show schematic illustrations of an embodiment of the objective changer apparatus according to the invention for an upright arrangement, in a lateral view in 6a and in a view from below in 6b.

FIGS. 7a and 7b show schematic illustrations of an embodiment of the objective changer apparatus according to the invention for an upright arrangement in a view from below with, in 7a, an adapter in the completely inserted state and, in 7b, the adapter in a work position.

FIGS. 8a to 8d show schematic illustrations of an objective changer apparatus according to the invention in four operational states: while equipping the objective transfer element in 8a, with an active objective moved into position in the transfer position in 8b, with an active objective moved into position in the work position in 8c and with a focused active objective in 8d.

The illustrations of the exemplary embodiments are exemplary and schematic. The same reference signs denote the same technical elements unless something else is explicitly stated.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
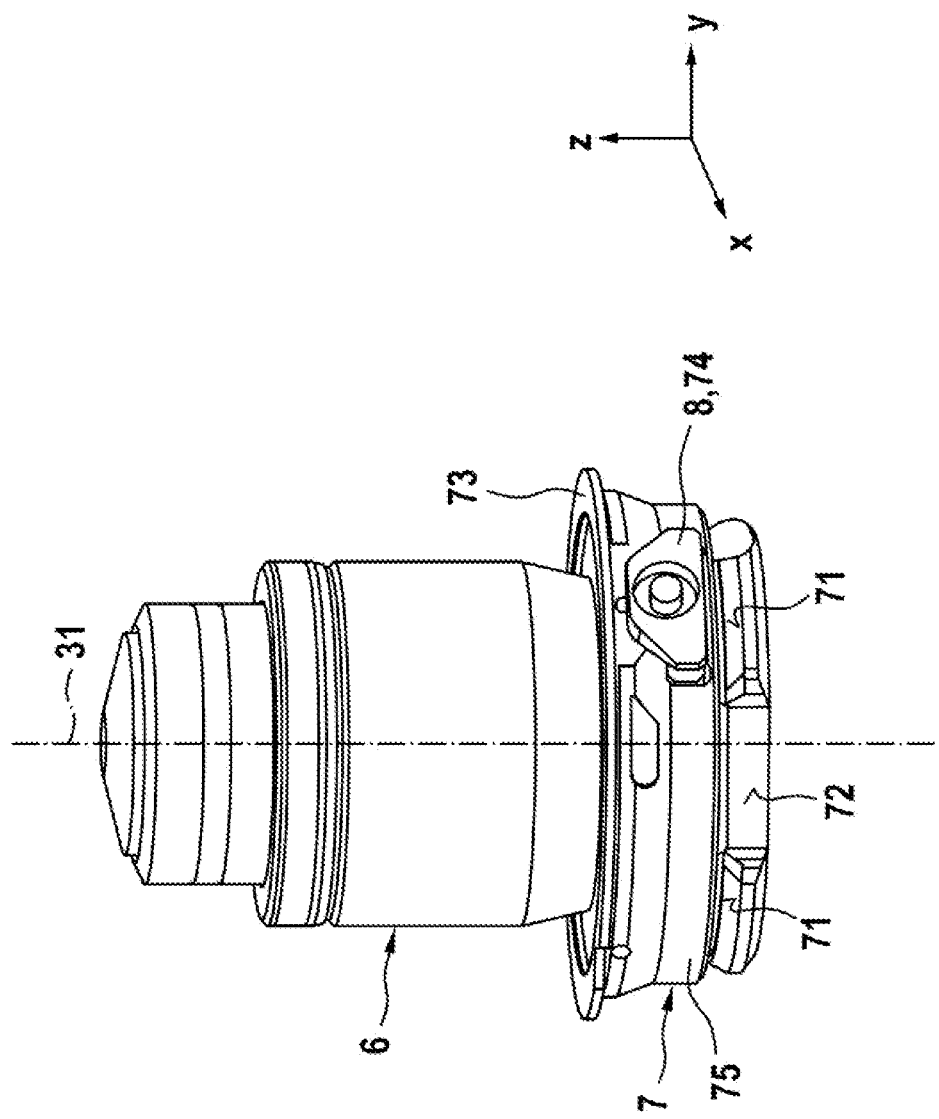
FIG. 1 shows a schematic illustration of an objective with an adapter according to the invention.

An objective 6 with an adapter 7 according to the invention is shown in FIG. 1 in exemplary fashion. The adapter 7 has a flange 73, which has plane contact faces at the top and bottom. A slot 74 is present in a base 75 of the adapter 7 (see also FIG. 5), an optical element 8, in this case a DIC slider 8, being able to be inserted transversely to the objective axis 61 and able to be held in said slot. The DIC slider 8 can be removed from the slot 74. Contact faces 71 and guide faces 72 are present on a base of the adapter 7. The contact faces 71 serve to ensure desired intended positioning if these are in contact with corresponding alignment faces 51 (see FIGS. 3, 4 and 9a to 9d).

Figure 2:
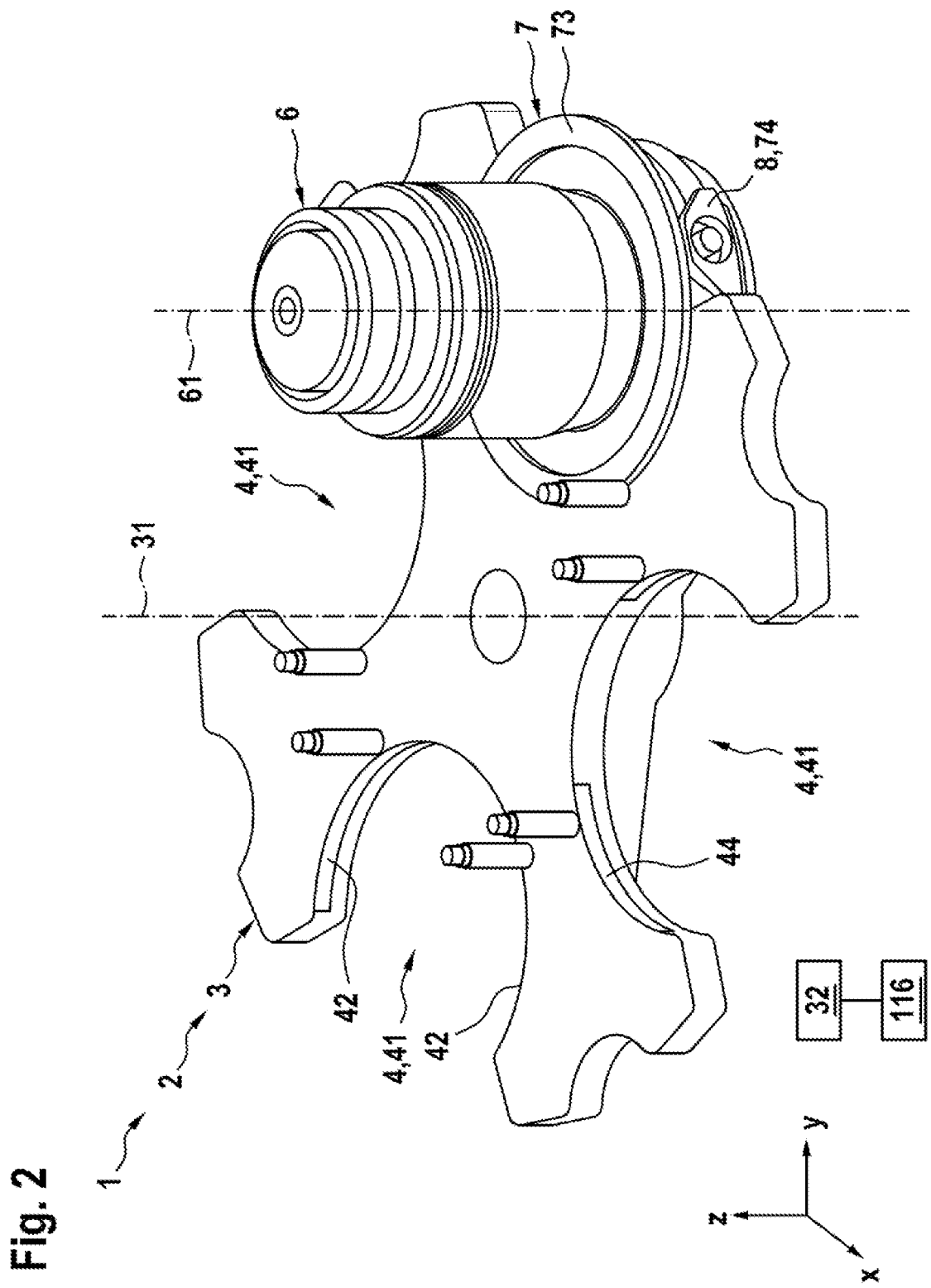
FIG. 2 shows a schematic illustration of an objective transfer element with an objective with an adapter at a transfer position.

An objective transfer element or, abbreviated, transfer element 3 is shown in FIG. 2 as a constituent part of an objective changer apparatus 2 (see FIGS. 6 to 9d) and of a microscope 1 (not illustrated in any more detail).

The transfer element 3 is embodied as a revolver with four objective holders 4 in the form of forks 41. An adapter 7 with an objective 6 is held in one of the forks 41. Here, the adapter 7 is seated with a plane lower contact face of its flange 73 on the limbs 42 of the relevant fork 41. The ends of the forks 41 are directed towards one another by a short distance, and so the forks 41 are slightly closed. As a result, the adapter 7 is held in the objective holder 4, even when centrifugal forces occur. The transfer element 3 is rotatable about a central axis of rotation 31 in controlled fashion by means of a drive 32 and a control unit 116, and so the individual objective holders 4 can be moved into position at any position on their orbit. Guides 44 in the form of elevations are present on the inner sides of the limbs 42 pointing into the respective fork 41, said elevations having corresponding embodiments to corresponding guide faces 72 of the adapter 7 or of the adapters 7 (see FIG. 3).

At least the ends of the limbs 42 can have a resilient embodiment in order to facilitate a lateral insertion or removal of the adapter 7, with the spring force of the resilient ends having to be overcome in each case.

Figure 3:
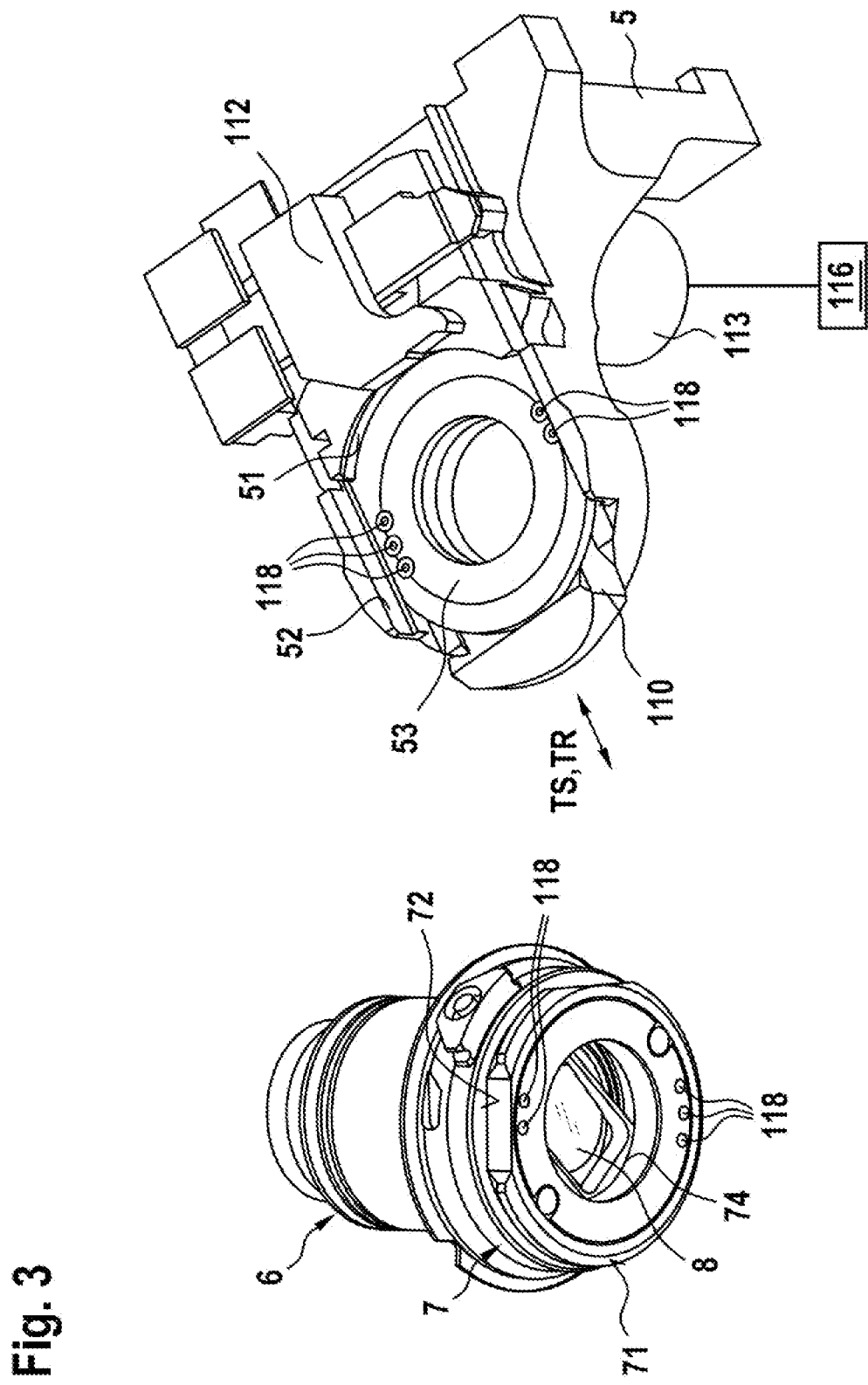
FIG. 3 shows a schematic illustration of a receiving apparatus.

FIG. 3 shows an exemplary embodiment of a receiving apparatus 5, on which a gripper 110, a drive 113 of the gripper 110 and an objective receptacle 53 for receiving an objective 6 that has been provided with an adapter 7 are present. The gripper 110 that is controllably driveable by means of the drive 113 can be moved back and forth along a transport direction TR and over a transport path TS (symbolized by a double-headed arrow). The transport direction TR is directed orthogonal to the optical axis 11 (see FIGS. 5 and 8c) of the microscope 1 when installed into the readied objective changer apparatus 2.

The drive 113 is connected to the control unit 116 and is actuatable by means of the latter. Moreover, the illustrated receiving apparatus 5 is equipped with a stripper 112 that is assembled on the gripper 110. The mode of operation of the stripper 112 is explained below in relation to FIGS. 5, 6a and 6b.

At least one alignment face 51 is present in a region of the objective receptacle 53. This can be contacted by an adapter 7 with at least one contact face 71 that is appropriately formed and arranged on the adapter 7. An intended position of the adapter 7 within the objective receptacle 53 is obtained when the contact face 71 and alignment face 51 are in contact. In order to ensure positioning of the adapter 7 in the objective receptacle 53 in the correct position, guides 52 are present on the objective receptacle 53 and guide faces 72 are present on the adapter 7, said guides and guide faces corresponding to one another.

Optionally, the objective receptacle 53 has been provided with contact elements 118, which may be embodied as contact faces or as contact pins in each case. An adapter 7 to be received in the object receptacle 53 may likewise have contact elements 118, which correspond to all or some of the contact elements 118 of the objective receptacle 53 in terms of position, form and design. Electrical control commands are transferable from the control unit 116 and/or information about current control states of the objective 6 and/or adapter 7 are transferable to the control unit 116 by way of the contact elements 118. Moreover, a power supply of components of the objective 6, for example of motor-driven drives and/or sensors, may be realized by way of the contact elements 118.

The optical element 8 inserted into the slot 74 can be seen in its embodiment as a DIC slider 8 in the view of the adapter 7 and the objective 6.

Figure 4:
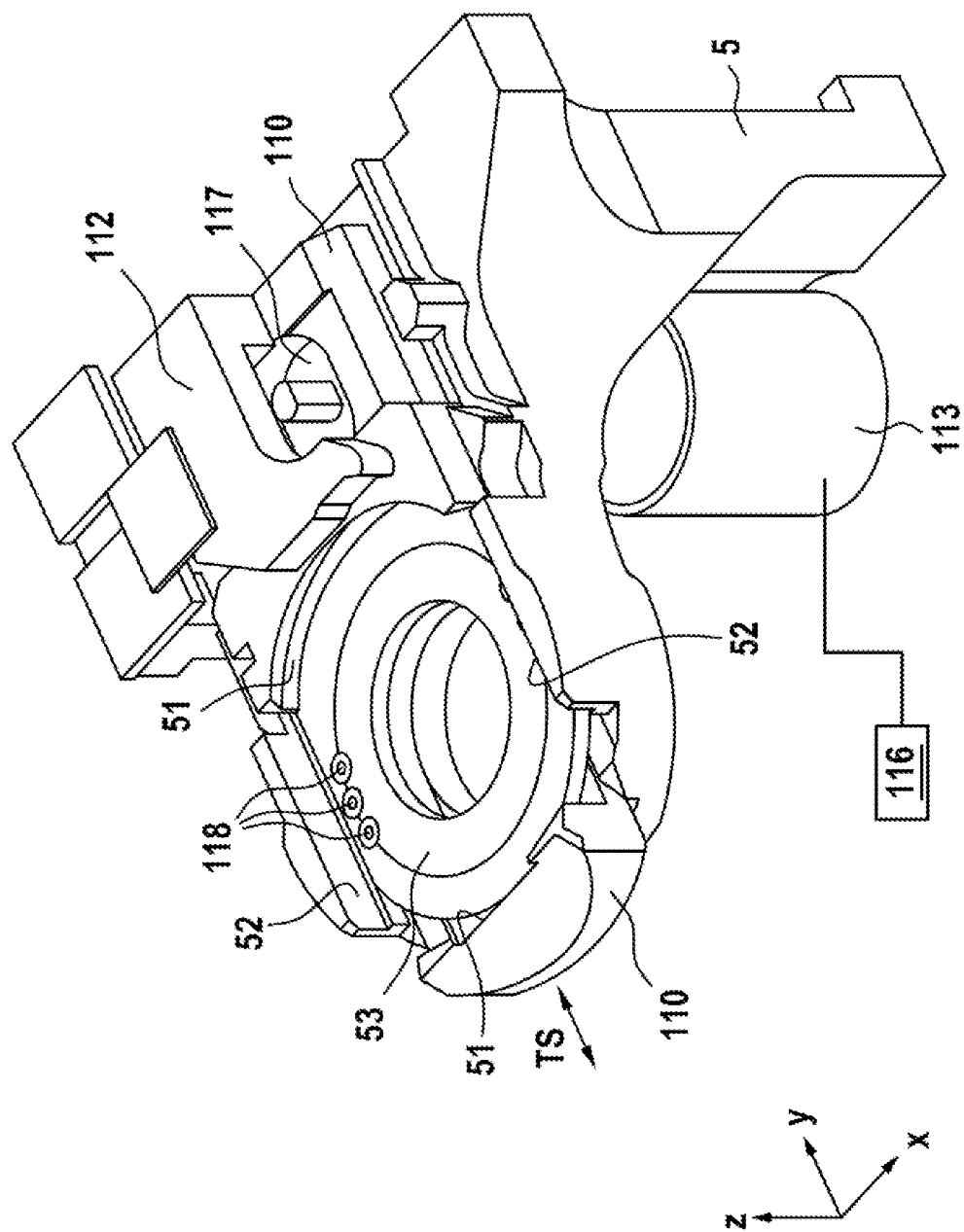
FIG. 4 shows a schematic illustration of the objective and the receiving apparatus with an adapter in the receiving apparatus, carriage and DIC slider.

The movements of the gripper 110 are controlled by the interaction of the drive 113 and a disc cam 117 driven thereby (FIG. 4). With a driver, the disc cam 117 engages in a corresponding recess of the gripper 110 and thereby transfers a push or pull movement on the gripper 110, which is thus moved accordingly along the transport path TS.

The exemplary embodiment of the receiving apparatus 5 shown in FIG. 5 is equipped with a carriage 9, which is guided along a carriage track 10 and which is driven in controlled fashion by means of a drive 120. The carriage 9 is provided with a magnet 111 in the form of a permanent magnet. The carriage 9 can be driven so closely to an optical element 8, in this case the DIC slider 8, that the magnet 111 interacts with a magnetic region of the DIC slider 8 and a releasable holding force is present between the DIC slider 8 and the magnet 111. The magnetic region of the DIC slider 8 could be a further magnet and/or a region suitable for magnetic interaction. By way of example, this region may consist of iron or contain iron.

FIG. 5 shows an adapter 7 that has been pulled into the objective receptacle 53 by means of the gripper 110 (see FIG. 4, for example) and whose covered and not visible contact faces 71 rest against the likewise covered and not visible alignment faces 51. An objective 6 connected to the adapter 7 has not been shown in order to provide a better overview. The objective axis 61 of the objective 6 held in the intended position coincides with the optical axis 11 of the microscope 1. In the example, the drive 120 of the carriage 9 is embodied as a motor-driven toothed belt.

The drive 113 of the gripper 110, the drive 120 of the carriage 9 and a drive 119 for moving the receiving apparatus 5 in the Z-direction and relative to a stand 115 of the objective changer apparatus 2 (also referred to as Z-drive 119 below) are connected to the control unit 116 and actuatable by the latter.

In order to facilitate precise and low-friction movement in the Z-direction, guide elements 114 in the form of sliding, ball and/or roller guides are situated between the receiving apparatus 5 and the stand 115.

In FIG. 5, the DIC slider 8 is pulled out of the beam path of the microscope 1 and it is no longer intersected by the optical axes 11, 61. A portion of the DIC slider 8 is still situated in the slot 74. In order to use the DIC slider 8 for corresponding image recordings or in order to push the DIC slider 8 back into the adapter 7, for example so that the adapter 7 can be changed, the drive 120 is actuated by the control unit 116 and the carriage 9 is moved towards the adapter 7. Image recording in the DIC method can be implemented if the DIC slider 8 is inserted into the adapter 7. By contrast, should the adapter 7 be changed, the drive 113 is actuated and the gripper 110 is moved in the transport direction TR. During this movement, the stripper 112 assembled on the gripper 110 is guided against the adapter 7 and the part of the optical element 8 protruding from the slot 74 and said stripper pushes the adapter 7 and the optical element 8 away from the receiving apparatus 5. In the process, the holding force between magnet 111 and optical element 8 is overcome and the optical element 8 is released from the magnet 111. This embodiment option is envisaged if the optical element 8 remains on the adapter 7 and it is changed together with the latter.

In a further embodiment option, the optical element 8 is removed from the slot 74 before the adapter 7 is changed and said optical element remains on the carriage 9.

Subsequently, the carriage 9 can be driven again into a position distant from the objective receptacle 53 in order to avoid inadvertent coupling to a DIC slider 8 of an adapter 7 that will be introduced next into the objective receptacle 53. Should the magnet 111 be an electromagnet, it is sufficient to deactivate the latter.

Figure 6B:
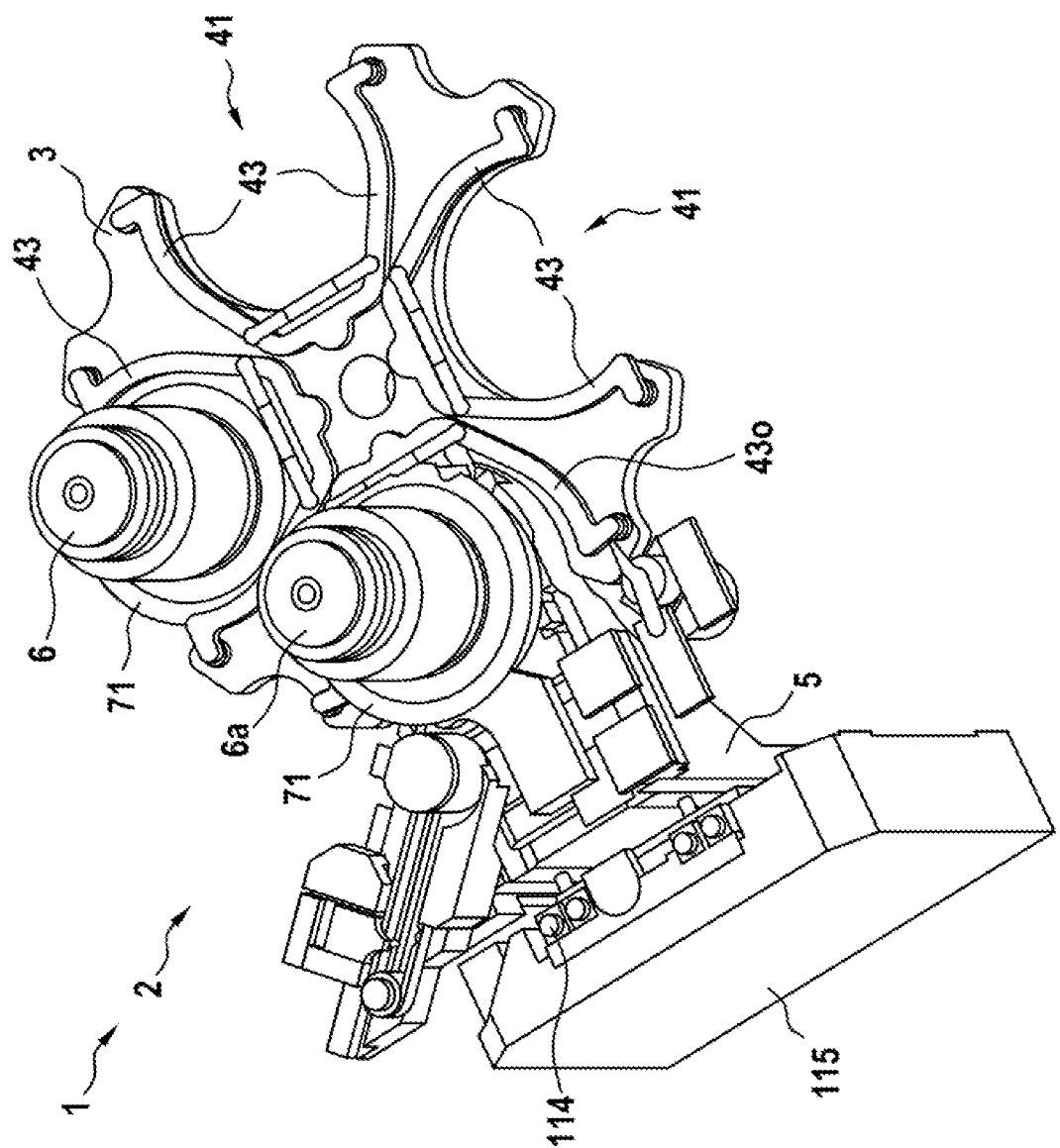

A further exemplary embodiment of the objective changer apparatus 2 according to the invention is shown in both FIGS. 6a and 6b. The objective changer apparatus 2 is constructed for an upright arrangement of transfer element 3 and receiving apparatus 5.

The objective holders 4 are embodied, once again, as forks 41 (see FIG. 2); however, they have a further holding element 43. In FIGS. 6a and 6b, one of the illustrated further holding elements 43 is shown in an opened state in each case; it is therefore referred to as further holding element 43o.

In the case of the upright arrangement, respectively one adapter 7 is inserted laterally in a gap 45 between the objective holder 4—embodied as a fork 41 in this case—and the respective further holding element 43. The latter can be designed in the form of a resilient joint. When the adapter 7 is inserted, the further holding element 43 is opened as a result of the lateral pressure exerted by the adapter flange 73 (see FIGS. 1 and 2). Once the adapter 7 has been pushed into the final position in the objective holder 4, the lateral pressure on the further holding element 43 recedes and the latter pulls shut again around the flange 73. Consequently, the adapter 7 and, where applicable, the objective 6 are securely held in the case of movements of the transfer element 3.

One of the objectives 6, referred to as active objective 6a here, is pulled into the objective receptacle 53 of the receiving apparatus 5 by means of the gripper 110. Before the active objective 6a can now be moved in the Z-direction, in order, for example, to focus the latter onto an object plane, a further element, for example a motor-driven lever, must act against the spring force of the further holding element 43. In the process, the latter has to be pressed open until the active objective 6a, in particular the adapter 7 thereof, is no longer blocked by the further holding element 43o and can be moved freely in the Z-direction.

The ends of the fork limbs 42 can be guided in grooves in order to hold the objectives 6 in the magazine against gravity.

In order to secure the adapter 7 against being hurled out during a rotation of the objective holder 4, the adapter 7 and the objective holder 4 can each have at least one magnet 111. A magnetic force that is produced between the magnets 111 of the objective holder 4 and of the adapter 7 holds the adapter 7 against radial forces that are envisaged during the operation of the objective holder 4. Alternatively, only the adapter 7 or the objective holder 4 has at least one magnet 111, if the respective counterpart thereof consists of a magnetic (ferromagnetic) material.

Alternatively, the further holding elements 43 can be configured as a resilient latch. The adapter 7 is inserted into the respective objective holder 4 from below and must be moved by a resilient latch. The spring force of the latter is dimensioned in such a way that the mass of the respective objective 6 with adapter 7 is held against gravity.

Figure 7A:
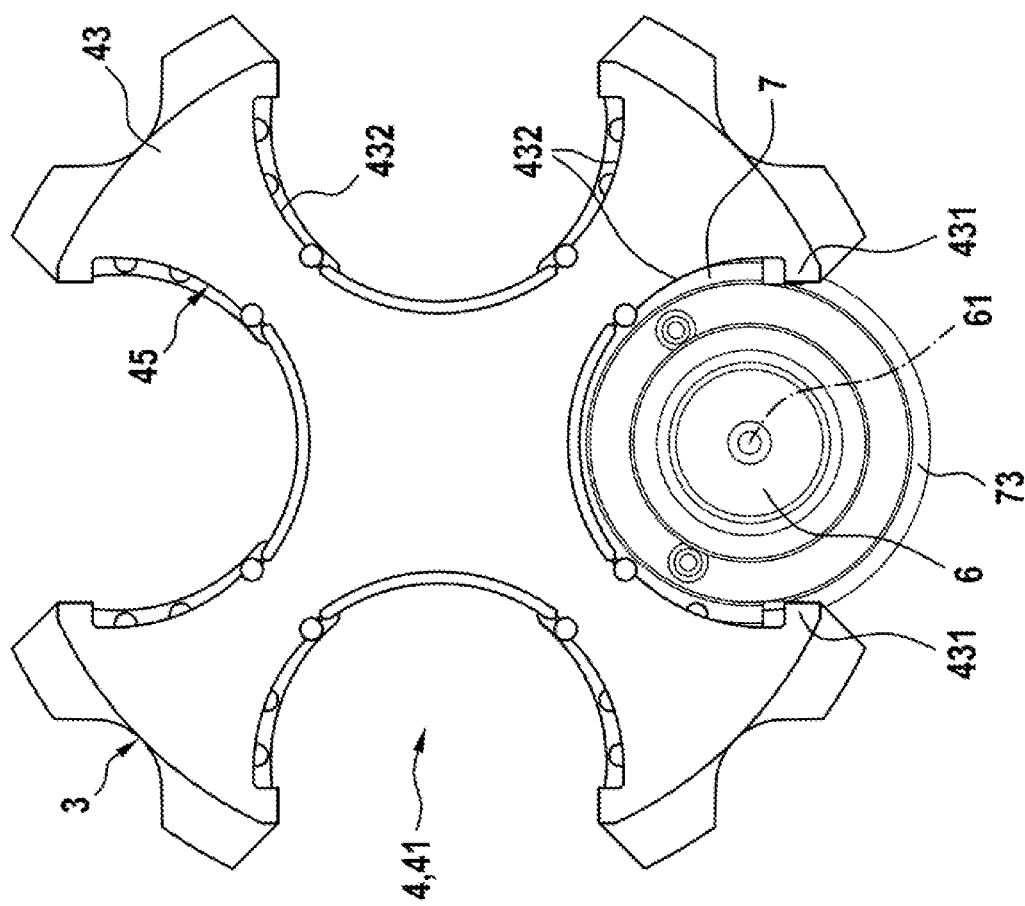

FIG. 7a and FIG. 7b show an alternative embodiment of the further holding element 43. The latter is embodied as a holding sheet which is spaced apart from the objective holder 4 in the region of the fork 41, and so the gap 45 is formed between holding sheet and objective holder 4. With its flange 73, the adapter 7 is inserted into the gap 45 and said adapter rests on the further holding element 43 with the flange 73, at least along portions of the flange 73 (FIG. 7a).

The further holding element 43 embodied as a holding sheet has protrusions 431 projecting into the opening of the fork 41 and/or pitch-circle-shaped cutouts 432. These correspond with the dimensions of the flange 73 in such a way that the adapter 7 that has been moved into the work position WP (symbolized by an arrow) can be guided past the further holding element 43 in at least one direction along the objective axis 61 (FIG. 7b).

Alternatively, use can also be made of one or more electromagnets in order to hold the objectives 6 and/or adapters 7 in the objective holder 4. These are deactivated as soon as the adapter 7 has been clamped.

Alternatively, permanent magnets on the adapter 7 and transfer element 3 may also be configured in such a way that the opposite poles thereof are opposite one another and attract one another. The holding force produced thus can be lifted by a movement, for example, perpendicular to the objective axis 61 or by a rotational movement about the objective axis 61. The separation can be amplified, for example, by further magnets on the transfer element 3, which, after the movement, are opposite magnets of the same polarity on the adapter 7. The occurring repulsive forces assist the separation of adapter 7 and transfer element 3.

FIGS. 8a to 8d and 9a to 9d are used to describe the method for moving an objective 6 that is provided with an adapter 7 and held in an objective holder 4 into position in line with the optical axis 11 of a microscope system 1 using the example of an inverse arrangement.

From a number of objectives 6 with adapters 7 held in the transfer element 3, one is selected as an active objective 6a (FIG. 8a). The transfer element 3 is rotated in controlled fashion about the axis of rotation 31 by means of the drive 32 until the active objective 6a has been moved into position in a transfer position CP. Here, the objective axis 61 and an optical axis 11 of the microscope 1 do not coincide but are aligned parallel to one another. All objectives 6 and 6a stored in the transfer element 3 are held in the objective holders 4 by way of their respective adapters 7 and are secured against laterally directed movements. For the purposes of elucidating the invention, the transport path TS is illustrated as having more than half the diameter of the objective 6.

By means of the Z-drive 119, the receiving apparatus 5 is lifted in the Z-direction until the adapter 7 of the active objective 6a comes into contact with the receiving apparatus 5 and the active objective 6a is lifted out of the objective holder 4 with its adapter 7 to such an extent that said objective can be moved in a transport direction TR substantially orthogonal to the optical axis 11 of the microscope 1 (FIG. 8b). The transport path TS travelled in the process is provided by the distance between optical axis 11 and objective axis 61. This lateral movement is facilitated because the adapter 7 of the raised objective 6 has been lifted slightly out of the objective holder 4 by means of the receiving apparatus 5 and/or because an element that blocks the lateral movement has been opened.

Figure 8C:
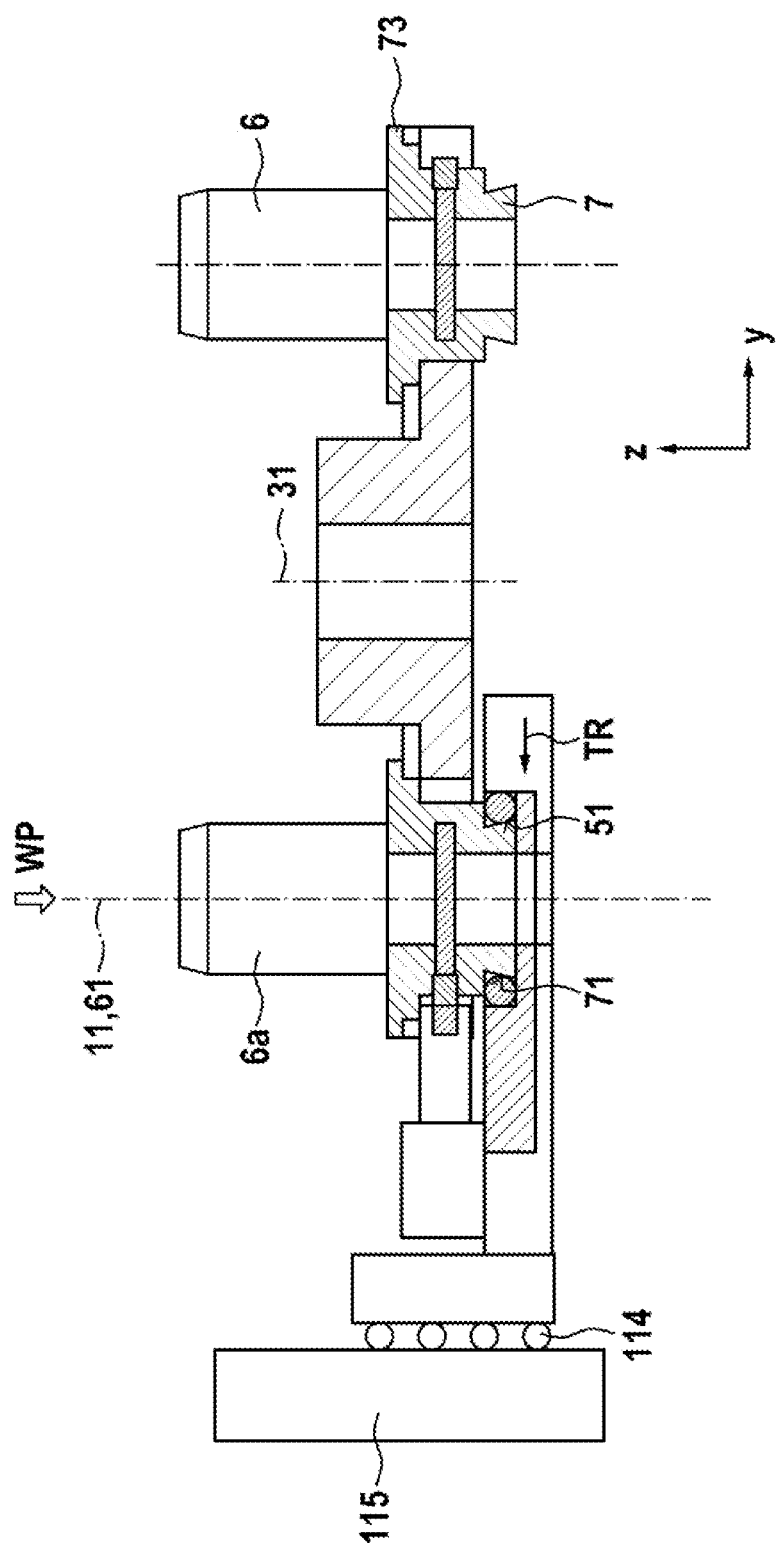

Here, the opened gripper 110 is extended in such a way that the latter can grip behind the adapter 7 and can pull the latter together with the active objective 6 out of the transfer position CP and into a work position WP in the transport direction TR and along the transport path TS (FIG. 8c). Here, the active objective 6a is moved over a relatively short transport path TS, and so at least regions of the adapter 7 still remain within the extent of the objective holder 4. Contact faces 71 are guided against alignment faces 51 of the objective receptacle 53 and these are held in contact with one another by the effect of the gripper 110 and the drive 113 thereof (see FIGS. 3, 4 and 5). In the work position WP, the objective axis 61 coincides with the optical axis 11 of the microscope system 1.

Figure 8D:
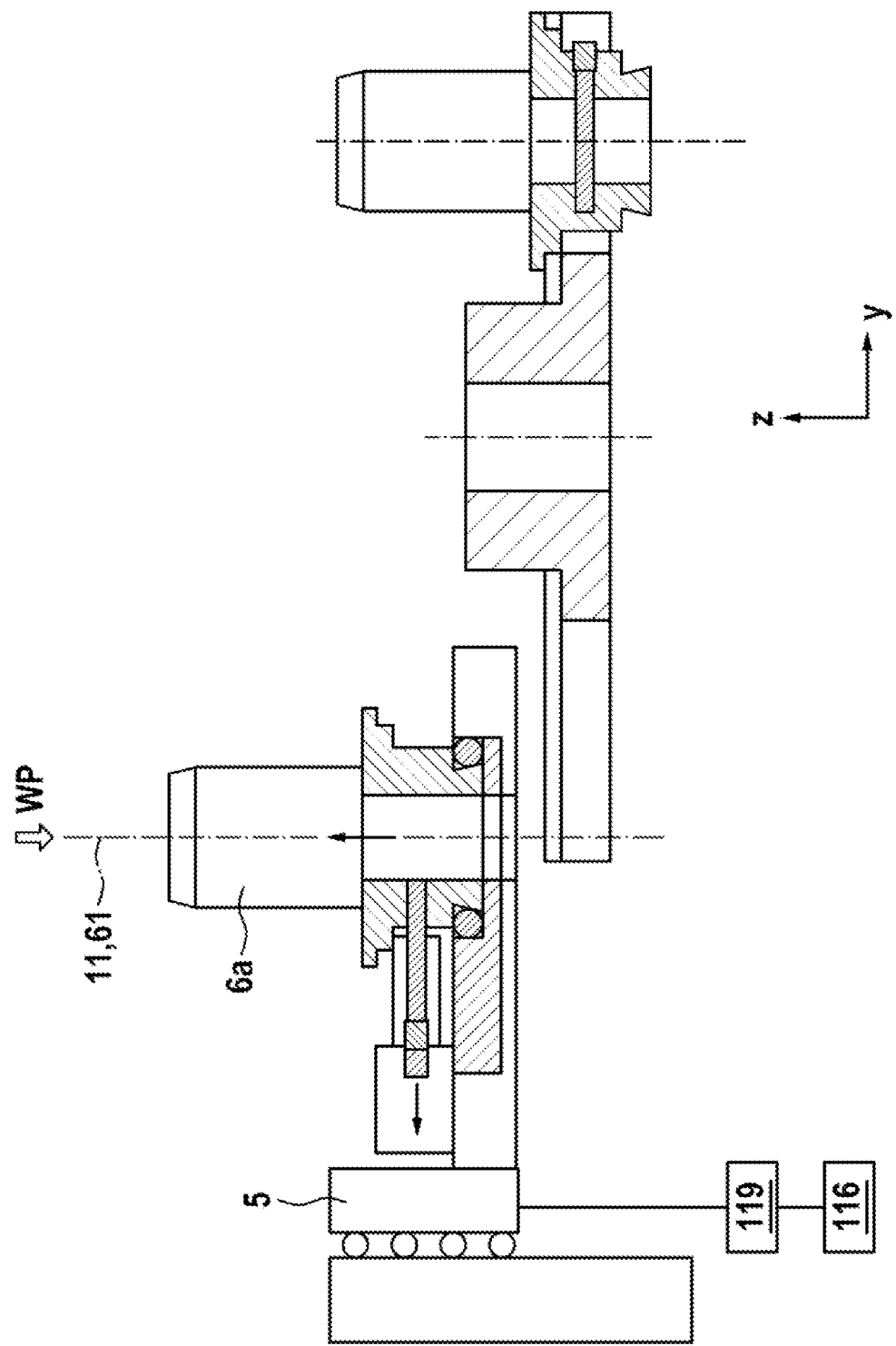

In order to set the active objective 6a situated in the work position WP in relation to an object plane, in particular in order to focus said active objective, the receiving apparatus 5 is displaced along the optical axis 11 of the microscope system 1 in the direction of the Z-axis Z by means of the Z-drive 119 until the desired setting has been reached (FIG. 8d).

Figure 9A:
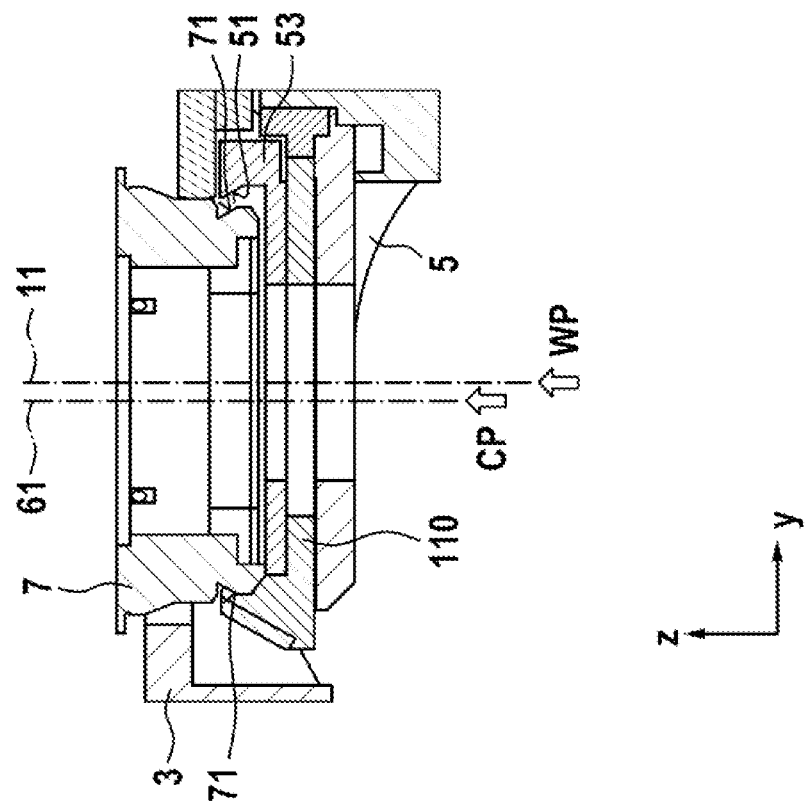
FIGS. 9a to 9d show schematic illustrations of the steps for moving an objective into position from a transfer position to a work position: with an objective in the transfer position in 9a, with the objective in the lifted state in 9b, with the objective in the work position in 9c and with the objective carrying out a focusing movement in the Z-direction in 9d.

FIGS. 8a to 8d illustrate details of the processes when moving an objective 6 with adapter 7 into position, from a transfer position CP into a work position WP. FIG. 9a shows the adapter 7 of the active objective 6a (not illustrated) in the objective holder 4 of the transfer element 3 in the transfer position CP. The objective axis 61 of the objective 6 situated in the transfer position CP does not coincide with the optical axis 11.

Figure 9B:
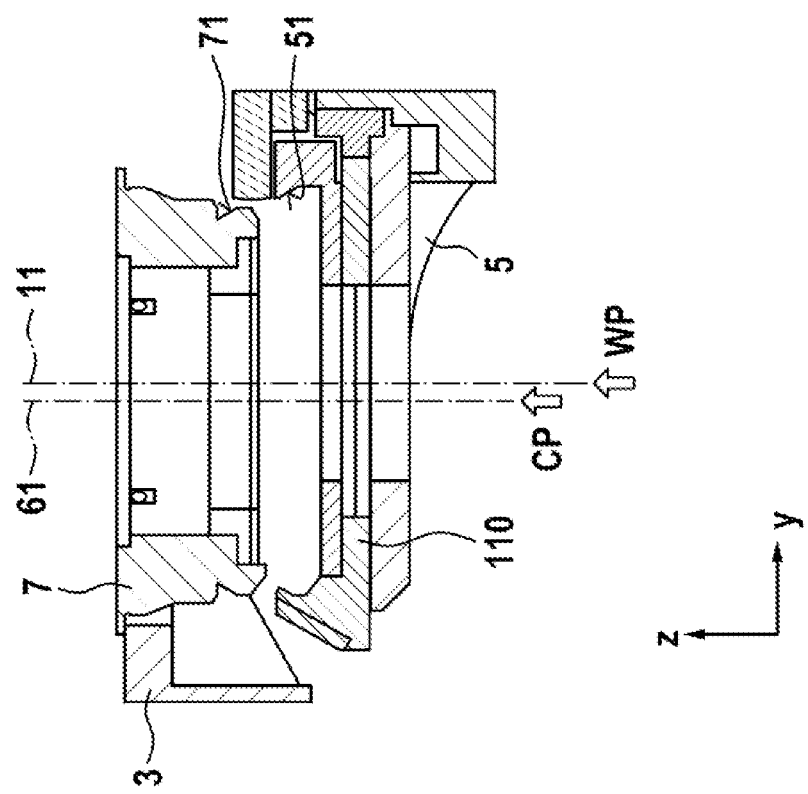

In FIG. 9b, the receiving apparatus 5 is displaced so far in the direction of the Z-axis that the adapter 7 is seated in the objective receptacle 53 and lifted a short distance out of the objective holder 4. The objective axis 61 and optical axis 11 are aligned parallel to one another but do not coincide. The contact faces 71 of the adapter 7 and the alignment faces 51 of the receiving apparatus 5 are not in contact with one another. The opened gripper 110 grips a contact face 71 behind the adapter 7.

Figure 9D:
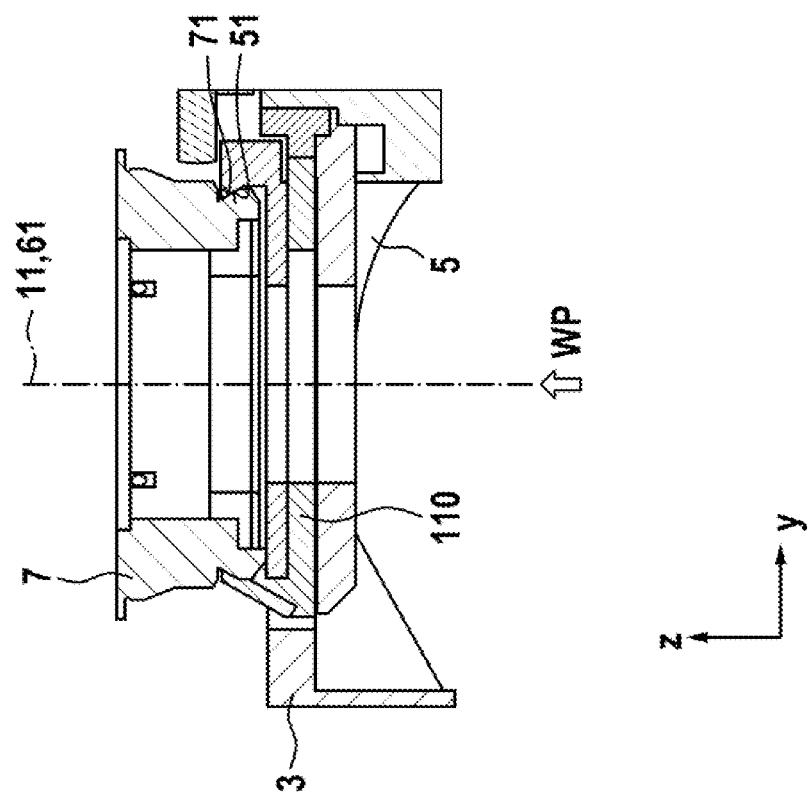
Figure 9C:
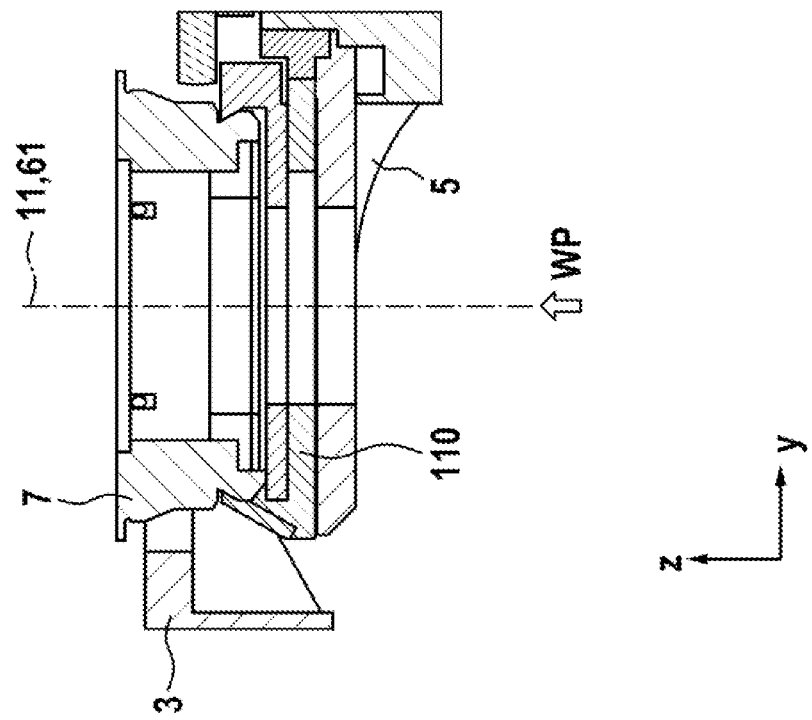

FIG. 9c shows the adapter 7 after the gripper 110 was driven in a controlled fashion and has pulled the adapter 7 together with the active objective 6a, not illustrated here, along the transport path TS (see FIG. 8b) into the work position WP. In the work position WP, the objective axis 61 and the optical axis 11 coincide.

FIG. 9d now schematically illustrates the adapter 7 that has been moved in the Z-direction along the optical axis 11. The latter is aligned and clamped in respect of the work position WP by the action of the gripper 110 and of the contact faces 71 and alignment faces 51. A spring that is optionally fastened to the gripper 110 presses the adapter 7 against the at least one alignment face 51.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE SIGNS

1 Microscope system
11 Optical axis of the microscope system
2 Objective changer apparatus
3 (Objective) transfer element
31 Axis of rotation
32 Drive of the transfer element 3
4 Objective holder
41 Fork
42 Limbs/resilient ends
43 Further holding element
431 Projection
432 Cutout
43o Further holding element, open
44 Guide
45 Gap
5 Receiving apparatus
51 Alignment face
52 Guide face
53 Objective receptacle
6 Objective
6a Active objective
61 Objective axis
7 Adapter
71 Contact face
72 Guide face
73 Flange (of the adapter 7)
74 Slot
75 Base
8 Optical element/DIC slider
9 Carriage
10 Carriage track
110 Gripper
111 Magnet
112 Stripper
113 Drive (gripper 110)
114 Guide elements
115 Stand
116 Control unit
117 Disc cam
118 Contact element
119 Drive in Z-direction
120 Drive of the carriage 9
121 Spring
CP Transfer position
WP Work position
TS Transport path
TR Transport direction

The invention claimed is:

1. An objective changer apparatus for a microscope system, comprising
an objective transfer element having at least one objective holder configured to hold an objective that has been provided with an adapter;
wherein the objective transfer element is configured to move a selected active objective into position in a transfer position;
wherein, in the transfer position, an objective axis of the active objective does not coincide with the optical axis of the microscope system;
the microscope system further comprising a receiving apparatus that is adjustable in the direction of the optical axis of the microscope system and able to brought into contact with the adapter of the active objective, the receiving apparatus being configured to transport the active objective along a transport path in a transport direction that is orthogonal to the optical axis of the microscope system between the transfer position and a work position in line with the optical axis of the microscope system; and
wherein the transport path is shorter than the extent of the objective holder in the transport direction, so at least regions of the adapter of the active objective situated in the work position are still within the extent of the objective holder.

2. The objective changer apparatus according to claim 1;
wherein the receiving apparatus is displaceable coaxially to the optical axis of the microscope system and embodied to lift the active objective at the transfer position.

3. The objective changer apparatus according to claim 1;
wherein an objective receptacle of the receiving apparatus has alignment faces configured to contact faces of the adapter of the active objective, wherein the active objective contacting the alignment faces with the contact faces is aligned parallel to the optical axis of the microscope system.

4. The objective changer apparatus according to claim 1; wherein the objective holder has a locking device configured to lock the adapter in the objective holder, at least in a direction parallel to the optical axis.

5. The objective changer apparatus according to claim 1; wherein the receiving apparatus has a gripper configured to engage with the active objective, wherein the gripper is displaceable in the transport direction and is configured to displace the active objective to the objective receptacle along a conveyor track.

6. The objective changer apparatus according to claim 1; wherein the at least one objective holder of the objective transfer element is fork-shaped.

7. The objective changer apparatus according to claim 1, further comprising:
a carriage configured to couple to an optical element to move the optical element into the optical axis of the microscope system and out of the optical axis of the microscope system.

8. The objective changer apparatus according to claim 7; wherein the carriage is provided with at least one magnet or a mechanical coupling mechanism, by means of which a detachable holding force is producible between the carriage and the optical element.

9. An adapter for use with an objective in an objective changer apparatus according to claim 1, the adapter comprising:
a flange configured to be placed onto an objective holder of the objective changer apparatus, the flange being further configured to hold the adapter in the objective holder; and
guide faces corresponding to correspondingly formed guide faces of a receiving apparatus of the objective changer apparatus, so that alignment of the adapter is maintained during transport of the adapter by the receiving apparatus along the transport path.

10. The adapter according to claim 9; wherein at least one guide face of the adapter has a contact face configured to contact an alignment face of an objective receptacle of the receiving apparatus.

11. The adapter according to claim 9, further comprising:
a slot configured to receive an optical element that is movable into the objective axis.

12. The adapter according to claim 11; wherein the adapter is configured to connect with the optical element so that the optical element remains on the adapter independently of a current use state of the adapter.

13. The adapter according to claim 11; wherein the slot is configured to removably accept the optical element so that the optical element can be inserted into the slot and from the slot.

14. A method comprising:
utilizing the adapter according to claim 11 with an objective in a microscope system.

15. A method for moving an objective that is provided with an adapter and held in an objective holder into position in line with an optical axis of a microscope system, comprising the steps of:
moving a selected active objective into position in a transfer position, wherein an objective axis of the active objective does not coincide with the optical axis of the microscope system in the transfer position;
transporting the active objective from the transfer position along a transport path and in a transport direction that is orthogonal to the optical axis of the microscope system to a work position by means of a receiving apparatus, wherein the objective axis of the active objective coincides with the optical axis of the microscope system in the work position, and the length of the transport path is chosen to be shorter than the extent of the objective holder in the transport direction such that at least regions of the adapter of the active objective situated in the work position are still within the extent of the objective holder; and
displacing the active objective, situated in the work position, along the optical axis to focus the active objective.

16. The method according to claim 15, further comprising:
displacing the active objective in the transfer position is a distance parallel to the optical axis of the microscope system and then transporting the active objective to the work position, wherein the active objective is released from the objective holder as a consequence of the displacement in the transfer position.

* * * * *

UNITED STATES PATENT AND TRADEMARK OFFICE
CERTIFICATE OF CORRECTION

PATENT NO. : 11,194,148 B2  
APPLICATION NO. : 16/386845  
DATED : December 7, 2021  
INVENTOR(S) : Saskia Pergande et al.

Page 1 of 1

It is certified that error appears in the above-identified patent and that said Letters Patent is hereby corrected as shown below:

In the Claims

Claim 9 please change "…along the transport path." to read --along a transport path.--

Signed and Sealed this
Twenty-sixth Day of September, 2023

Katherine Kelly Vidal
*Director of the United States Patent and Trademark Office*